United States Patent [19]

Mullane

[11] Patent Number: 4,817,278
[45] Date of Patent: Apr. 4, 1989

[54] SIDE TERMINAL CONNECTION BY FUSING

[75] Inventor: William E. Mullane, Warren, Ohio

[73] Assignee: The Taylor-Winfield Corporation, Warren, Ohio

[21] Appl. No.: 224,989

[22] Filed: Jul. 25, 1988

[51] Int. Cl.⁴ .................. B23P 19/00; H01M 2/02
[52] U.S. Cl. .................................. 29/730; 429/179
[58] Field of Search ........................ 29/730; 429/179

[56] References Cited

U.S. PATENT DOCUMENTS

| 4,150,202 | 4/1979 | Tiegel | 429/179 |
| 4,446,214 | 5/1984 | Mocas | 429/179 |
| 4,573,260 | 3/1986 | Mullave et al. | 29/730 X |
| 4,642,442 | 2/1987 | Mullave et al. | 29/730 X |

Primary Examiner—Stephen J. Kalafut
Attorney, Agent, or Firm—William J. Ruano

[57] ABSTRACT

Apparatus for simultaneously fusing both positive and negative side terminal posts of a lead acid storage battery having a pair of tombstones of L-shape. Each of the terminal posts has an inwardly extending projection extending into a substantially U-shaped opening at the top of the vertical legs of the tombstones. A pair of spaced induction coils are connected in series. A mold surrounds each coil for confining fused metal to fill the substantially U-shaped opening in the top of the tombstones for providing an integral connection between the terminal posts and the vertical portions of the tombstones when the terminal posts and tombstones are lifted into the molds and the induction coils are energized.

2 Claims, 4 Drawing Sheets

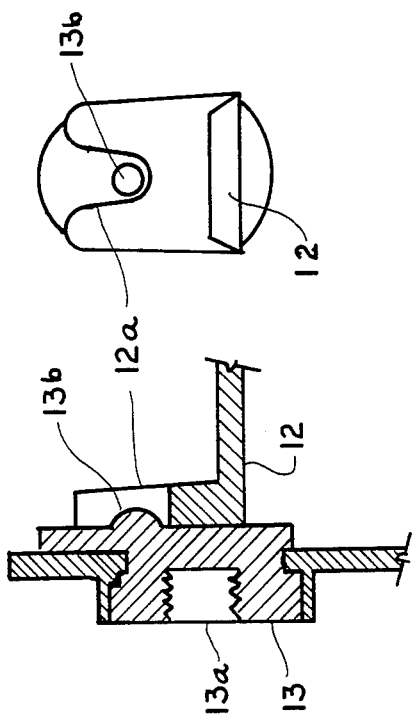
FIG. 4
FIG. 5
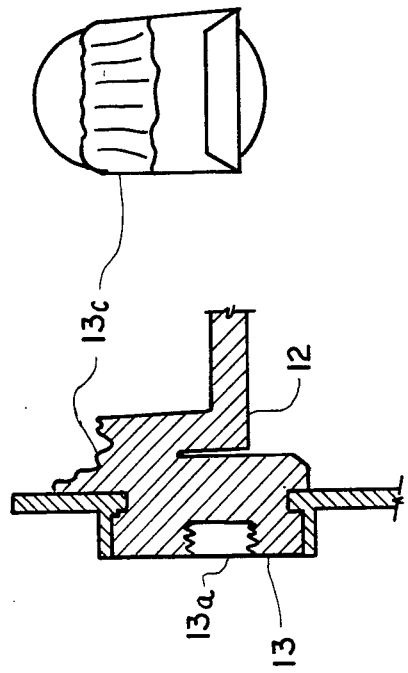
FIG. 6
FIG. 7
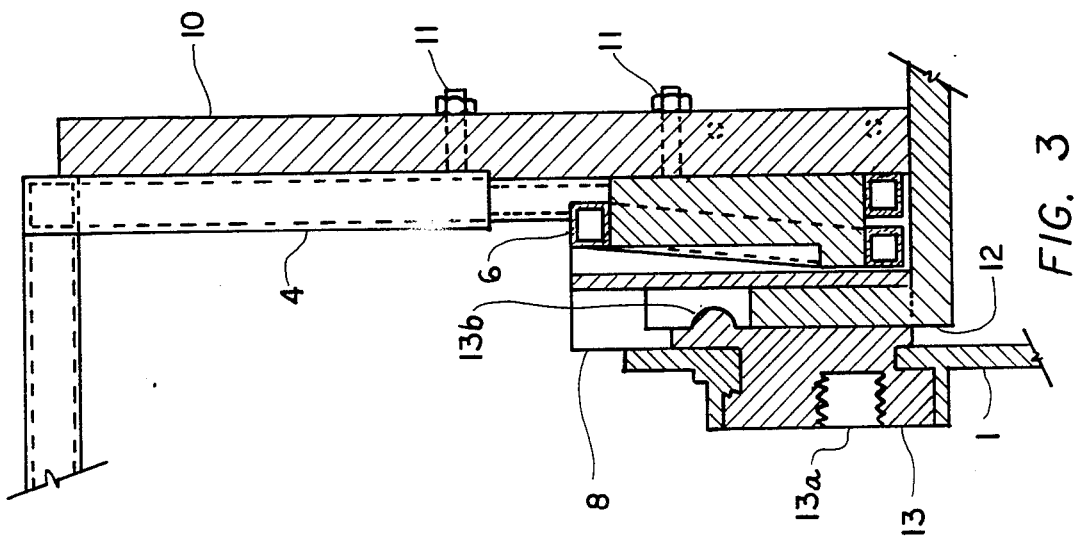
FIG. 3

SIDE TERMINAL CONNECTION BY FUSING

This invention relates to an apparatus and method of fusing side terminal posts by induction heating.

BACKGROUND OF THE INVENTION

Heretofore, there has been no speedy or satisfactory way, adaptable for mass production of forming side terminal connections in batteries. Usually these connections have been made singly.

SUMMARY OF THE INVENTION

An object of the present invention is to overcome the above mentioned disadvantages by providing a speedy method and apparatus for simultaneously fusing both side terminal posts at the same time by induction heating.

BRIEF DESCRIPTION OF THE DRAWINGS

FIG. 2a is a section taken along line 2a—2a of FIG. 2;

FIG. 4 is a partial cross sectional view of FIG. 3 showing only the terminal post and L shaped tombstone before fusion;

FIG. 5 is a side view of the terminal post and tombstone of FIG. 4 before fusion;

FIG. 6 is a cross sectional view similar to FIG. 4 except showing the terminal post and tombstone after they are fused together;

FIG. 7 is a side view of FIG. 6 after fusion; and

DETAILED DESCRIPTION OF A PREFERRED FORM OF THE INVENTION

Figure 1:
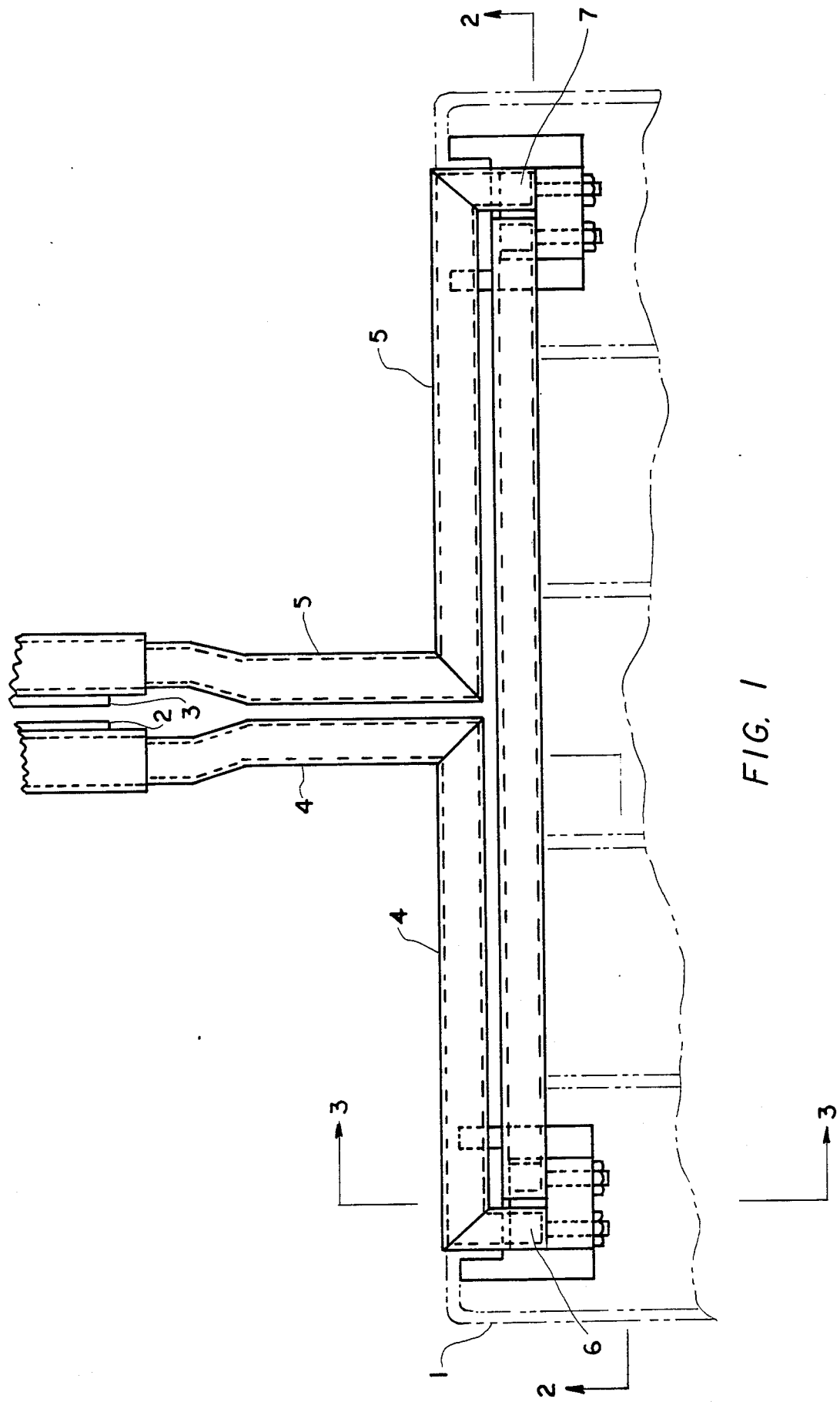
FIG. 1 is an elevational view, partly in cross-section, of the lead-ins and a pair of coils surrounded by molds for heating and fusing side terminals or posts of a lead-acid storage battery when they are lifted into the molds.
Figure 2:
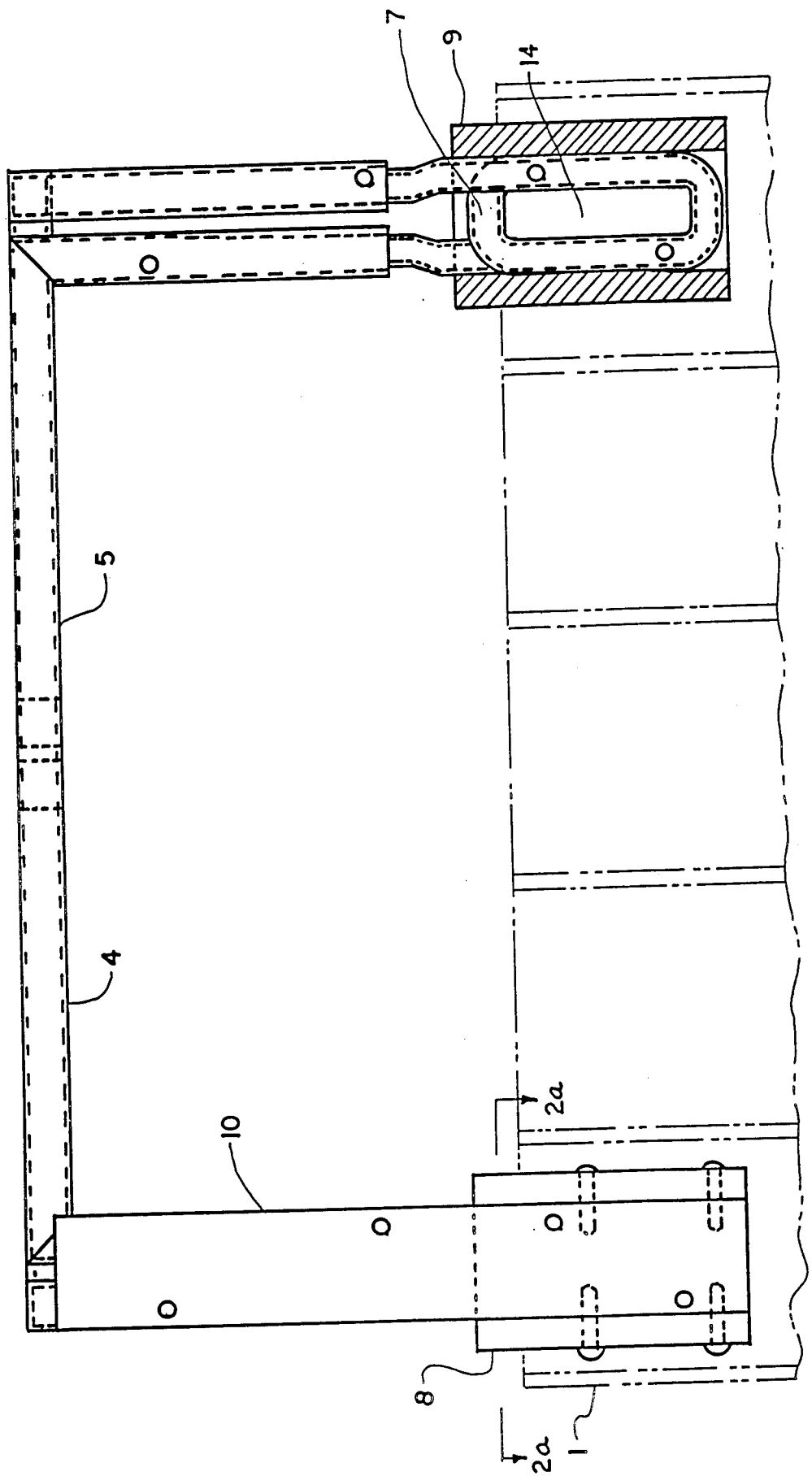
FIG. 2 is a view partly in cross section taken along line 2—2 of FIG. 1.

Referring to FIGS. 1 and 2, numeral 1 denotes a battery case of the lead acid storage type, which case may be of polypropylene or other suitable material. Numerals 2 and 3 denoted lead blocks connected, respectively, to lead-in copper buses 4 and 5 of rectangular tubular cross-section for electrically conducting current to coils 6 and 7 of two turns each which coils are connected in series and which are for the purpose of simultaneously fusing the side terminal posts 13 shown in FIGS. 3, 4 and 5. A Ferrite block, such as 14, is surrounded by each coil. In operation, the terminal post 13 and L-shaped tombstone 12 of FIG. 3 are lifted into the structure shown in FIGS. 1-2 and into the corresponding mold 8, as shown in FIG. 3.

After the terminal posts 13 and tombstones 12 are vertically slid into the molds 8 and 9, pressure is applied on the Dielecto stud plates 10 to push the mold sides. The pressure may be applied by an air cylinder (not shown).

Figure 3:
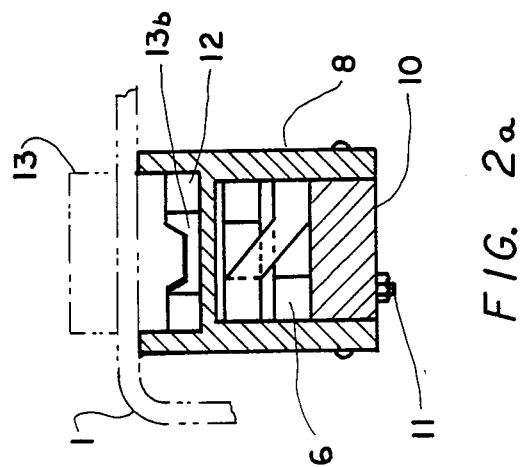
FIG. 3 is a vertical cross-sectional view taken along line 3—3 of FIG. 1.
Figure 10:
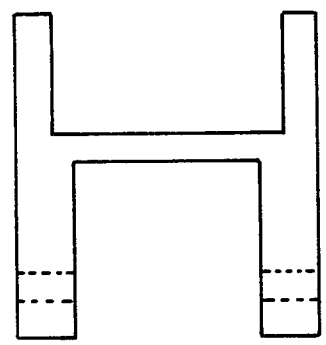
FIGS. 8, 9 and 10 are front, side and top views of one of the molds.
Figure 9:
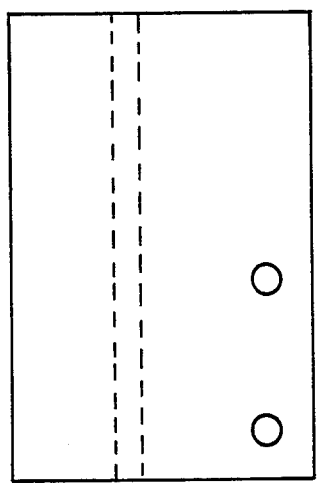
Figure 8:
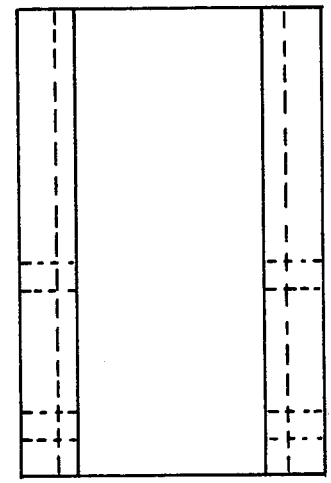

Referring to FIG. 3, bus 4 leads current through coil 6 having two turns which coil is enclosed in an insulating, glass filled Teflon mold 8 (see FIGS. 8, 9 and 10) for defining the shape of fused material after induction heating by coils 6 and 7 connected in series.

Referring to FIGS. 3 and 4, a Dialecto stud plate 10 of electrical insulating material is fastened by bolts 11 to bus 4 and mold 8. The side terminal post 13, extending through battery case 1, has a threaded opening 13 on one side and a projection 13b on the other, which projection extends into a somewhat U-shaped opening 12a of the tombstone 12 of L-shape, as more clearly seen in FIGS. 4 and 5.

Upon application of induction current through coils 6 and 7 at a frequency of 550 VHZ for about 4.5 seconds, and cooling about 3 seconds, seconds, the projection 13b will fuse and will be integrally connected to the L-shaped tombstone 12 as better shown in FIGS. 6 and 7 to the bottom of which tombstone the battery grid is connected (not shown). Thus both positive and negative side terminals are fused at the same time.

A speedy way for mass producing fused connections to both side terminals of the battery at the same time is to lift the battery with its tombstone by a fixture (not shown) until obtaining the position shown in FIG. 3 and thereafter applying induction heating current to both induction coils 6 and 7 simultaneously to form two simultaneous fused connections at the two side terminals of the battery similar to that shown in FIGS. 6–7.

Thus it will be seen that I have provided a speedy method for simultaneously fusing the side posts or terminals of a lead acid storage battery, adapted to mass production, such as by lifting a plurality of batterys at the same time for insertion of the posts and tombstones within the insulating molds surrounding the induction coils, thereby greatly speeding the time for making simultaneous fused positive and negative side terminals of a plurality of batteries at the same time.

While I have illustrated and described a single specific embodiment of my invention, it will be understood that this is by way of illustration only and that various changes and modifications may be contemplated in my invention within the scope of the following claims.

I claim:

1. Apparatus for simultaneously fusing both positive and negative side terminal posts of a lead acid storage battery, comprising a pair of tombstones of L-shape, said terminal posts each having an inwardly extending projection extending into a substantially U-shaped opening at the top of the vertical legs of said tombstones, a pair of spaced induction coils connected in series, a mold for surrounding each coil for confining fused metal to fill the said substantially U-shaped opening in the top of said tombstones for providing an integral connection between said terminal posts and said vertical portions of said tombstones when said terminal posts and tombstones are lifted into said molds and the induction coils are energized.

2. Apparatus recited in claim 1 further comprising a pair of Ferrite blocks each surrounded by one of said coils.

* * * * *